ର
3,037,981
PHENYLTETRAHYDROPYRANYLPIPERAZINES
Shin Hayao, Elkhart, Ind., assignor to Miles Laboratories,
Inc., Elkhart, Ind., a corporation of Indiana
No Drawing. Filed Mar. 23, 1959, Ser. No. 800,953
6 Claims. (Cl. 260—268)

This invention relates to new and useful compositions of matter and particularly to phenyltetrahydropyranylpiperazines which possess physiological activity and are useful as anorexic or appetite-depressant agents in the treatment of obesity in man.

More specifically, the new compounds may be designated as 1-phenyl or 1-substituted phenyl-4-(2-tetrahydropyranyl)piperazines and represented by the following structural formula:

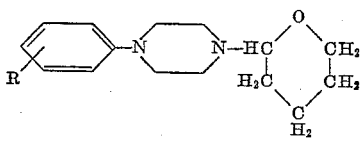

wherein R may be hydrogen or halogen atoms or hydroxy, lower alkyl or lower alkoxy groups.

The above defined compounds can be prepared conveniently by reacting phenylpiperazine or an appropriately substituted phenylpiperazine with 2-hydroxytetrahydropyran. This mode of formation may be graphically presented by the following equations:

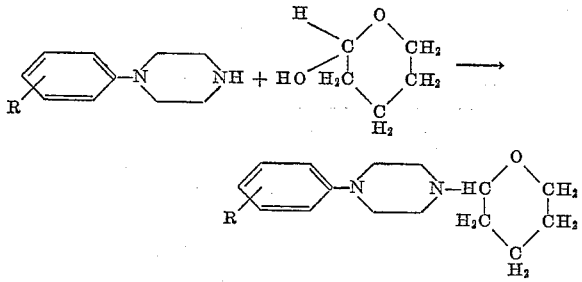

wherein R has the meaning ascribed to it above.

The present compounds may be obtained as free bases having the formula given above or preferably, for pharmacological use, as suitable non-toxic, water-soluble addition salts of halogen acids, sulfuric acid, maleic acid, and the like.

These new compounds and the methods for their preparation may be exemplified more specifically by the following illustrative examples:

EXAMPLE I

1-Phenyl-4-(2-Tetrahydropyranyl)Piperazine

To a solution of 1-phenylpiperazine (32.4 g., 0.2 mole) in 100 ml. of methanol was added all at once 2-hydroxytetrahydropyran (22.4 g., 0.22 mole) to give a clear solution which in a few minutes separated a crystalline solid. The reaction mixture was kept at room temperature for 2 hours and the solid was collected, yield 37.4 g., M.P. 97–98°. From the filtrate on addition of water was obtained another 5.4 g. of the product melting at 96–97°. Thus, the total yield of the product was 42.8 g. (87.0%). A sample was once recrystallized from aqueous methanol to give colorless needles melting at 98–99°. Analysis.—Calcd. for $C_{15}H_{22}N_2O$: N (basic), 5.69. Found: N (basic), 5.66. (One N determined by titration.)

The above free base (21.3 g., 0.087 mole) was dissolved in 150 ml. of hot methanol and added to 100 ml. of isopropanol saturated with dry hydrogen chloride to give the dihydrochloride as a colorless powder melting at 180–181° (d.) yield 26.2 g. (95%). Analysis.—Calc'd. for $C_{15}H_{24}Cl_2N_2O$: HCl, 22.9. Found: HCl, 23.2.

EXAMPLE II 1-p-Chlorophenyl-4-(2-Tetrahydropyranyl)Piperazine

To a solution of 1-p-chlorophenylpiperazine (78.6 g., 0.4 mole) in 500 ml. of methanol was added 2-hydroxytetrahydropyran (40.8 g., 0.4 mole) all at once. A colorless solid separated from the solution in a few minutes. After standing at room temperature for 3 hours the solid was collected and dried in air—yield 103.1 g., M.P. 148–148.5°. Analysis.—Calc'd. for $C_{15}H_{21}ClN_2O$: N (basic), 4.99. Found: N (basic), 5.05. (One N determined by titration.) The filtrate was diluted with water to give additional 2.6 g. of the product melting at 145–146°. Thus, the total yield was 105.7 g. (94%). The dihydrochloride did not melt up to 255°. Analysis.—Calc'd. for $C_{15}H_{23}Cl_3N_2O$: HCl, 20.7; N, 7.92. Found: HCl, 20.2; N, 8.00.

EXAMPLE III 1-p-Tolyl-4-(2Tetrahydropyranyl)Piperazine

This compound was prepared in 87% yield from 1-p-tolylpiperazine and 2-hydroxytetrahydropyran. The pure free base (from aqueous methanol) melted at 93–95°. Analysis.—Calc'd. for $C_{16}H_{24}N_2O$: N, 10.8. Found: N, 10.9. A dihydrochloride was prepared as usual and it melted at 217° (dec.). Analysis.—Calc'd. for $$C_{16}H_{26}Cl_2N_2O$$

HCl, 21.92. Found: HCl, 21.97.

EXAMPLE IV 1-p-Methoxyphenyl-4-(2-Tetrahydropyranyl)Piperazine

This compound was synthesized in 88% yield from 1-p-methoxyphenylpiperazine and 2-hydroxytetrahydropyran. The free base melted at 89–90° C. Analysis.—Calc'd. for $C_{16}H_{24}N_2O_2$: N, 10.15. Found: N, 9.92. (Kjeldahl). The dihydrochloride melted at 236–237° (dec.). Analysis.—Calc'd. for $C_{16}H_{26}Cl_2N_2O_2$: HCl, 20.9. Found: HCl, 21.2.

EXAMPLE V 1-o-Chlorophenyl-4-(2-Tetrahydropyranyl)Piperazine

This compound was prepared in 87% yield from 1-o-chlorophenylpiperazine and 2-hydroxytetrahydropyran. This compound was isolated as a monohydrochloride which melted at 113–114° C. Analysis.—Calc'd. for $C_{15}H_{22}Cl_2N_2O$: HCl, 11.51. Found: HCl, 11.87.

The novel compounds of this invention, as pointed out above, have utility as anorexic agents. As such they compare very favorably with commercially available products in that they surpass them in anorexic activity. In addition superior utility as appetite-depressant compositions is indicated at anorexic dosages by the absence of such undesirable side effects as hypertension, hyperkinesis and C.N.S. stimulation, which are potentially harmful to patients with cardiovascular disease and which are characteristic of amphetamines and other anorexic products. This desirable quality in the subject compounds is attributable to their chemical nature as phenylpiperazine compounds, which as is well known, tend to possess hypotensive properties.

The table below will illustrate in greater detail the anorexic activity of the subject compounds as compared with well known commercial products.

The data on acute anorexic activity in the rats shown in this table were obtained by means of a screening technique carried out as follows:

Rats are used which have been fasted for 18–20 hours, weight 200 g.±50 g. and, without drug, are able to consume one 3 g. food tablet or pellet within 15 minutes of being offered the food. The food test is carried out 45–60 minutes and 165–180 minutes after intubations of water (in control experiments) or after oral administration of the drug. Anorexia is assumed for each observation period if less than 25% of the food offered is not consumed.

COMPARATIVE DATA ON ANOREXIC ACTIVITY IN THE RAT

| Compound | Percent A-LD50 [2] | | A-AED50 [1] mg./kg. | |
|---|---|---|---|---|
| | 1 hr. | 3 hrs. | 1 hr. | 3 hrs. |
| Dexedrine (d-Amphetamine) | 3.4 | 4.2 | 3.6 | 4.4 |
| Compound of Example II | 3.5 | 3.5 | 9.8 | 9.8 |
| Compound of Example I | 4.7 | 6.3 | 6.8 | 9.1 |
| Dexamyl (d-Amphetamine, amobarbital) | 12 | | 126 | |
| Preludin (Phenmetrazine) | 15 | | 60 | |
| dl-Amphabar | 17 | | 17 | |

[1] Acute median anorexic dose.
[2] Acute median lethal dose for oral administration to rats.

The above table clearly demonstrates that, for instance, the subject compound of Example II not only approaches d-amphetamine in anorexic activity but also exhibits a superior duration of anorexic effect, evidenced by the finding that the acute anorexic ED50 at the 3-hour observation period is identical to that at the 1-hour observation period.

Pharmaceutical compositions which have utility as anorexic materials are conveniently and easily produced by combining a compound of the class hereinbefore described with fillers, carriers, extenders and/or excipients, such as are generally used in the preparation of pharmaceutical products which are to be taken orally or given parenterally, especially for human use. The compounds may be used in the form of the free base or of the salts of acids which are water-soluble and non-toxic, such as the hydrochloride, hydrobromide, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salts, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water-soluble salts, may be associated with such carriers as water, saline solution, glucose solution, and the like.

We have found that for oral administration a suitable dosage unit is from about 50 to 300 milligrams of the compound per tablet, capsule, or other dosage form. Where the material is to be administered parenterally, then a suitable dosage unit would be from about 35 to 300 milligrams of the active ingredient.

Dosages as above described may be administered as frequently as conditions demand, and it is understood, of course, that for children the dosages are correspondingly smaller, depending upon the age and weight of the child, as those skilled in the art will appreciate.

The following examples will illustrate in detail typical procedures for preparing a number of representative dosage unit forms of our compositions in accordance with this invention:

EXAMPLE V

A pharmaceutical composition having the following formulation was prepared.

| | Mg. |
|---|---|
| 1-p-chlorophenyl-4-(2-tetrahydropyranyl)-piperazine | 50.0 |
| Lactose | 200.0 |
| Magnesiumstearate | 5.0 |

The chlorophenyl-tetrahydropyranylpiperazine is mixed with the lactose and thoroughly wetted with water. The wetted material is then pressed through a sieve of the desired size and dried in an oven at about 140° F. When dry, the magnesium stearate is added, and the composition is dry-mixed thoroughly. The mixed material is then compressed into tablets.

It will be understood that the above example is only representative of one specific form of this invention. Other excipients such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid and the like are operable.

For best results from about 2 to 10 parts by weight of the lubricant is used. It will be understood that any of the piperazines described above may be used as the active ingredient of the composition. Depending on the dosage unit desired, from 50 to 300 parts of the desired compound will be used.

EXAMPLE VI

For capsules the following formulation was used:

| | Mg. |
|---|---|
| 1-p-chlorophenyl-4-(2-tetrahydropyranyl)-piperazine | 500.0 |
| Lactose | 1000.0 |
| Talc | 75.0 |

This material was prepared as described in Example V above, that is, the piperazine and the lactose were wetted, sieved, dried, and mixed with the talc. Capsules each containing 50 mg. of the active ingredient were prepared.

In summary, the present invention relates to 1-phenyl or 1-substituted phenyl-4-(2-tetrahydropyranyl)piperazines which have physiological properties, and to methods of using the same. Formation of the subject compounds is effected by synthesis from a 1-phenyl or 1-substituted phenylpiperazine and 2-hydroxytetrahydropyran. An especially preferred representative compound is 1-p-chlorophenyl-4-(2-tetrahydropyranyl)piperazine.

For pharmaceutical use the compounds of the present invention may be compounded as tablets, powders, capsules, etc. for oral ingestion, admixed with such common diluents as cornstarch, lactose, talc, etc. or they may be used together with such carriers as saline or glucose solutions where to be given parenterally. Suitable dosage units are from about 50 to 300 mg. of the compound per tablet or other dosage form for oral administration and from about 25 to 300 mg. for parenteral administration.

What is claimed is:

1. A new composition of matter selected from the group consisting of phenyltetrahydropyranylpiperazines of the formula:

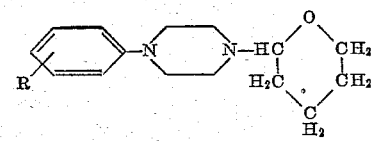

wherein R is a member of the group consisting of hydrogen and halogen atoms and hydroxy, lower alkyl and lower alkoxy groups and non-toxic water soluble acid addition salts thereof having therapeutically acceptable anions.

2. 1-phenyl-4-(2-tetrahydropyranyl)piperazine.
3. 1-p-chlorophenyl-4-(2 - tetrahydropyranyl)piperazine.
4. 1-o-chlorophenyl - 4 - (2 - tetrahydropyranyl)piperazine.
5. 1-p-tolyl-4-(2-tetrahydropyranyl)piperazine.
6. 1-p-methoxyphenyl-4-(2 - tetrahydropyranyl)piperazine.

References Cited in the file of this patent
UNITED STATES PATENTS 2,836,595   Parcell _____ May 27, 1958

OTHER REFERENCES

Cerkovnikov et al.: Archiv. Zu Kenji, pages 28–29 (1946).
Goodwin et al., The Pharmaceutical Jour., vol. 181; 4952, pages 233–235, September 1958.
Laurence et al., British Medical Journal, pages 700–702 (1958).
British Med. J., pages 938–939, April 19, 1958.
Keele: The Lancet, pages 243–246, Jan. 31, 1959.